Patented Dec. 19, 1939

2,184,170

UNITED STATES PATENT OFFICE 2,184,170

METHOD OF PREPARING SELENYL ARYL THIAZOLES

Lawrence R. Sperberg, Habana, Cuba, assignor to Wingfoot Corporation, Wilmington, Del., a corporation of Delaware No Drawing. Application August 23, 1938, Serial No. 226,304

10 Claims. (Cl. 260—304)

This invention relates to a method of preparing selenium compounds and, more particularly, to a method of preparing selenyl aryl thiazoles.

The mercaptobenzothiazoles are well known compounds for which methods of preparation have been thoroughly worked out but the corresponding selenium compounds, in which selenium replaces sulfur in the mercapto group, are not so well known and methods for their preparation are not so well established. The present invention aims to provide a method for the preparation of these compounds in satisfactory yields and of adequate purity. The method consists in reacting a selenide with a halogen-substituted aryl thiazole to yield the particular compound desired. The reaction may be carried on in water or other appropriate solvent and heat is usually required. However, the temperature is not critical and reaction may ensue at temperatures from that of the room, about 25–30° C., up to about 100° C. or even higher. Equivalent or molecular proportions are ordinarily provided but an excess of one reactant or the other may be present. The reaction is preferably carried on under a reflux condenser and non-oxidizing conditions are desirable since the product oxidizes rather readily. Such conditions may be maintained by flushing out the apparatus with hydrogen before the run is started and then passing a small stream of hydrogen therethrough during the reaction.

To illustrate the process, the following example is given, but it will be understood that the invention is not limited to the condition stated and that various modifications may be made therein.

Example

Sodium hydroselenide was first prepared by dissolving 18 grams (.48 mol) of sodium hydroxide in 800 cc. of water and saturating with hydrogen selenide. An additional 18 grams of sodium hydroxide in 200 cc. of water was then added to form the normal sodium selenide. This was reacted with 68 grams (.40 mol) of chlor benzothiazole added through a reflux condenser and the temperature was then raised to 98° C. very rapidly. After about a half hour all of the chlor benzothiazole had gone into solution and further heating did not appear to increase the yields or to cause any other change in the solution. The product was precipitated with dilute hydrochloric acid and purified by reprecipitating from caustic twice. The precipitate was filtered with suction and allowed to dry, a quantitative yield being obtained. Analysis: S, 15.00, 15.10%. Se, 36.2%. Calculated for $C_7H_5NSSe$: S, 14.94. Se, 36.9%. The product, therefore, is presumed to have the formula

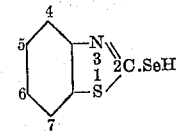

Selenium can be introduced by means of any of a number of selenides, such as the normal selenides, the hydro selenides and the poly selenides, particularly, sodium selenide, sodium hydroselenide, and sodium poly selenide. In general, the alkali metal selenides will be found to be the most available and, of these, the normal selenides are preferred.

The reaction is applicable to the preparation of other selenyl thiazoles, particularly the 2-selenyl aryl thiazoles, such as 2-selenyl benzothiazole, the preparation of which has been described above. Such compounds are generally included by the formula

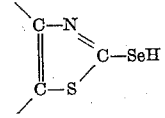

wherein there is attached to the open bonds of the adjacent carbon atoms of the thiazole ring, hydrogen or aliphatic or aromatic radicals. Preferably, however, these two adjacent carbon atoms form part of an arylene radical, such as phenylene, nitro phenylene, and naphthalene radicals. Among such compounds may be mentioned 2-selenol 6-nitro benzothiazole, 2-selenol alpha naphthothiazole, 2-selenol 6-tertiary butyl benzothiazole, 4-5-dimethyl 2-selenol thiazole, 2-selenol 6-tertiary amyl benzothiazole, 4-phenyl 2-selenol thiazole, 2-selenol 6-oxy phenyl benzothiazole, 4-5-di p-anisyl 2-selenolthiazole, 4-5-diphenyl 2-selenol thiazole, 2-selenol 5-nitro benzothiazole, 5-6 or 7-methyl 2-selenol benzothiazoles, 2-selenol 5- or 6-chlor benzothiazole, 5-6- or 7-hydroxy 2-selenol benzothiazoles, 2-selenol 5- or 6-amino benzothiazole, 2-selenol AR-tetrahydro alpha naphthyl thiazone, etc.

The process may be applied to the preparation of the foregoing and other selenol aryl thiazoles by treating the corresponding halogen aryl thiazole with one of the selenides mentioned above. The halogen substituent may be chlorine or bromine or one of the other halogens, but is usually chlorine, the halogen atom being split out in the process and, therefore, not characterizing the product.

While there have been described above certain preferred embodiments of the invention, the same is not limited thereto but only by the appended claims wherein it is intended to set forth all features of patentable novelty residing in the invention.

What I claim is:

1. A method of preparing 2-selenyl aryl thiazoles which comprises reacting a selenide with a 2-halogen-substituted aryl thiazole.

2. A method of preparing 2-selenyl aryl thiazoles which comprises reacting a selenide with a 2-chlorine-substituted aryl thiazole.

3. A method of preparing a 2-selenyl benzothiazole which comprises reacting a selenide with a 2-chlorine-substituted benzothiazole.

4. A method of preparing a 2-selenyl aryl thiazole which comprises reacting a hydroselenide with a halogen-substituted aryl thiazole.

5. A method of preparing a 2-selenyl aryl thiazole which comprises reacting a polyselenide with a 2-halogen-substituted aryl thiazole.

6. A method of preparing a 2-selenyl aryl thiazole which comprises reacting an alkali metal selenide with a 2-halogen-substituted aryl thiazole.

7. A method of preparing a 2-selenyl aryl thiazole which comprises reacting an alkali metal selenide with a 2-chlorine-substituted benzothiazole.

8. A method of preparing 2-selenyl benzothiazole which comprises reacting sodium selenide with 2-chlorobenzothiazole and precipitating the product.

9. A method of preparing 2-selenyl aryl thiazoles which comprises reacting a selenide with a 2-halogen-substituted aryl thiazole under non-oxidizing conditions.

10. A method of preparing 2-selenyl aryl thiazoles which comprises reacting a selenide with a 2-halogen-substituted aryl thiazole in an atmosphere of hydrogen.

LAWRENCE R. SPERBERG.